Patented Feb. 21, 1928.

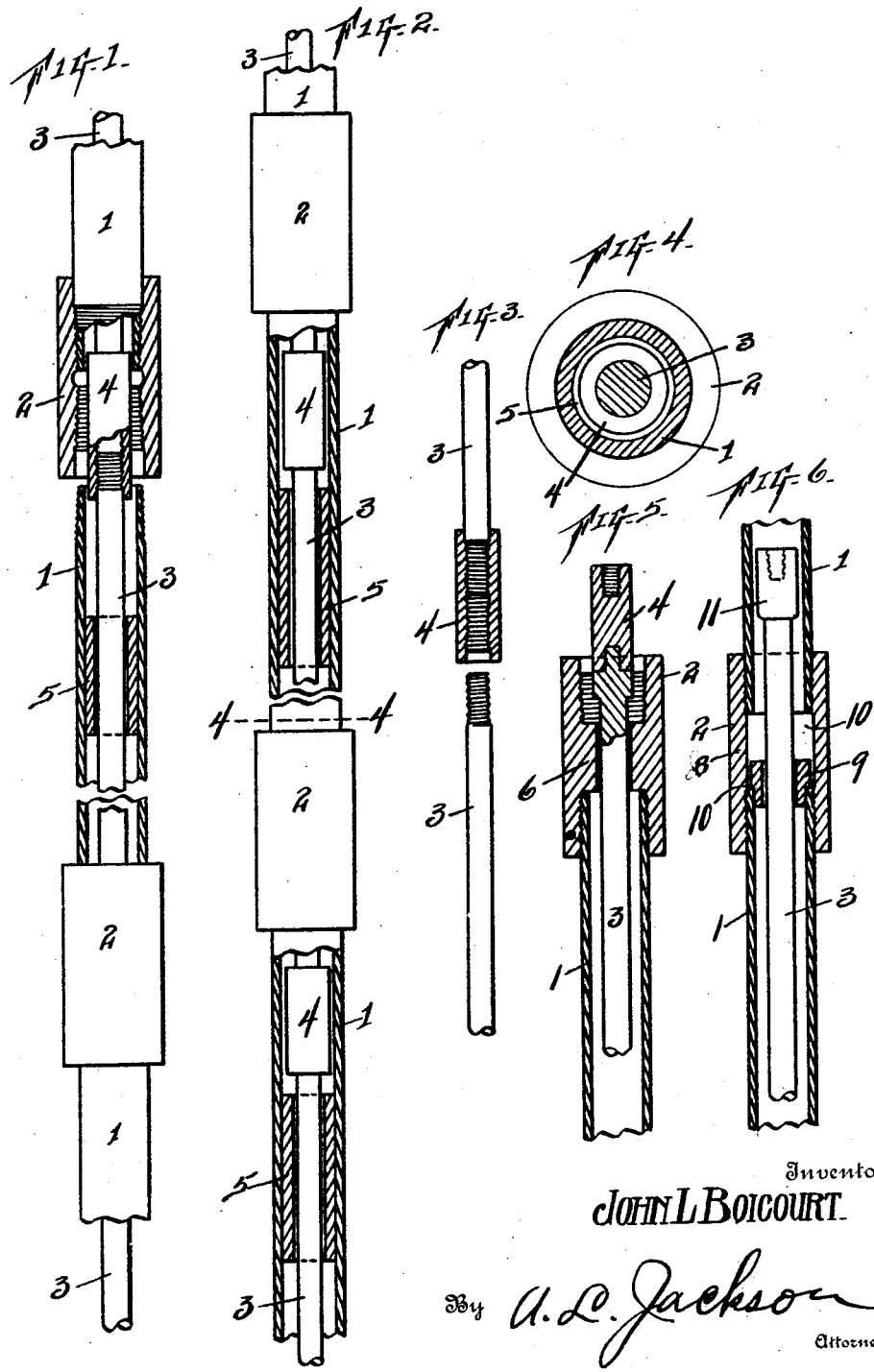

1,659,940

UNITED STATES PATENT OFFICE.

JOHN L. BOICOURT, OF FORT WORTH, TEXAS.

GUIDE BEARING FOR SUCKER AND PULL RODS.

Application filed December 31, 1923. Serial No. 683,674.

My invention relates to pump rods and more particularly to guide bearings for double acting pump rods; and the object is to provide simple devices which will prevent wear of the outside rod by the inside rod and which will prevent buckling or unnecessary vibrations of the inside rod. Another object is to make the pump rods more easily removed from the well for repairs or other purposes. Other objects and advantages will be fully explained in the following description and the invention will be more particularly pointed out in the claims.

Reference is had to the accompanying drawings which form a part of this application.

Fig. 1 is a broken sectional elevation, showing the construction of the joints of the inside and outside rods and showing one of the guide bearings. Fig. 2 is a broken sectional elevation, showing two outside rod couplings, two rod couplings, and two guide bearings. Fig. 3 illustrates the rod couplings. Fig. 4 is a horizontal section enlarged, taken on the line 4—4 of Fig. 2. Fig. 5 shows a variation in the construction of the exterior column coupling. Fig. 6 shows a variation in the guide bearing and a variation in the rod coupling.

Similar characters of reference are used to indicate the same parts throughout the several views.

The drawings show a pipe or cylinder 1 in sections coupled together by couplings 2, the sections 1 being usually twenty feet long. The rod 3 is also in sections coupled together by couplings 4.

The improvement is shown as guide bearings made of sections of pipe 5. These sections are made rigid with the pipe sections 1, a guide-bearing 5 in each pipe section. The guide-bearings are so arranged that they will lift the rod sections 3 by engaging the couplings 4. When the rod pipe 1 is lifted by the ordinary elevators, the bearing members 5 serve as elevators for the rod sections 3 by engaging the lower ends of the couplings 4. The pipe sections 1 are elevated by the usual elevators which catch under the couplings 2, two elevators being used alternately. One elevator will lift the pipe column by catching under one coupling. This lifts the pipe column twenty feet. Before the elevator releases the elevated column, the next elevator is placed under the next coupling 2. The lifting of the pipe column automatically lifts the rod column because a bearing-guide 5 will catch under a rod coupling 4. As each pipe section is raised above the well casing the section is unscrewed from the coupling 2 and removed. The inclosed rod section 3 can then be unscrewed from the coupling 4. Thus one section 1 of the pipe column is removed at a time and one section 3 of the rod column is removed at a time. This is one function of the guide-bearing 5. The guide-bearing 5 may be a bronze bushing.

The other functions of the guide-bearing 5 is to prevent the rod column from rubbing against and wearing the pipe column. The guide-bearing 5 will also prevent the vibration and buckling of the rod column. The guide-bearing 5 thus prevents lashing together of the rod column and the pipe column, prevents the wearing away of the rods and couplings, and stiffens the rod column by holding the slack rod in perfect alignment with the taut rod, one rod being taut at all times. By such construction and arrangement, the weight of the columns can be reduced approximately 50%.

It is apparent that more than one guide-bearing 5 may be inserted in the exterior pump rod 1. The guide-bearings constitute shoulders for engaging a coupling or shoulder of the rod column or interior pump rod. Various other changes may be made in the sizes, construction, and arrangement of the several parts without departing from my invention.

Fig. 5 illustrates a shoulder 6 in a coupling 7 which may be used instead of the guide-bearing or shoulder 5 of the previous views.

Fig. 6 illustrates a coupling for the exterior pump rod and this coupling 8 has interior shoulders 10 for a guide-bearing 9 which is held against displacement by the shoulders 10. This view also shows a variation 11 in the coupling of the interior pump rod. The guide bearing 9 may or may not be rigid with the exterior pump rod 1. The bearing 9 will serve the same purpose in the elevation of the pipe sections as in previous views. The bearing 9 will engage the element 11 for elevation just as bearing 5 engags element 4 of the previous views. The shoulder 10 merely co-operates with that portion of the bearing 9 which projects down into the element 1.

What I claim, is,—

1. In a double acting pump rod consisting of a pipe column in a plurality of sections and a rod column in sections provided with rod couplings; a guide-bearing consisting of a section of pipe rigid with the interior of said pipe column and adapted to engage a coupling of said rod column for lifting said rod column.

2. A guide bearing and lifting device for exterior and interior pump rods comprising a section of pipe rigid with the interior of said exterior rod and surrounding said interior pump rod loosely and adapted to engage said interior pump rod for lifting the same.

3. The combination with an exterior pump rod and an interior pump rod consisting of sections and couplings connecting the sections, of a guide bearing rigid with the interior of said exterior pump rod and surrounding loosely a portion of a section of said interior pump rod serving to prevent wear of said exterior pump rod and adapted to engage a coupling of said interior pump rod for lifting the same.

In testimony whereof, I set my hand, this 17th day of December, 1923.

JOHN L. BOICOURT.